(12) United States Patent
Sample

(10) Patent No.: US 12,550,238 B2
(45) Date of Patent: Feb. 10, 2026

(54) CONSTANT CURRENT HIGH EDGE-RATE DRIVER SYSTEM AND RELATED METHODS

(71) Applicant: United States of America as represented by the Secretary of the Navy, San Diego, CA (US)

(72) Inventor: Dwane Sample, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 362 days.

(21) Appl. No.: 18/307,701

(22) Filed: Apr. 26, 2023

(65) Prior Publication Data

US 2024/0365449 A1    Oct. 31, 2024

(51) Int. Cl.
*H05B 45/30* (2020.01)
*H05B 45/325* (2020.01)
*H05B 45/345* (2020.01)

(52) U.S. Cl.
CPC ......... *H05B 45/345* (2020.01); *H05B 45/325* (2020.01)

(58) Field of Classification Search
CPC ...... H05B 45/10; H05B 45/30; H05B 45/325; H05B 45/345; H05B 47/10
See application file for complete search history.

(56) References Cited

U.S. PATENT DOCUMENTS

| | | | |
|---|---|---|---|
| 6,906,931 B1* | 6/2005 | Batarseh | H02M 3/33569 363/17 |
| 9,537,383 B1* | 1/2017 | Wibben | H02M 1/38 |
| 2013/0221368 A1* | 8/2013 | Oraw | H10H 29/10 257/89 |
| 2021/0076465 A1* | 3/2021 | Aoki | H05B 45/14 |

FOREIGN PATENT DOCUMENTS

EP    2989862 B1 *   8/2019   ............. H05B 45/10

* cited by examiner

*Primary Examiner* — Jimmy T Vu
(74) *Attorney, Agent, or Firm* — Naval Information Warfare Center, Pacific; Kyle Eppele

(57) ABSTRACT

A driver system comprising a bridge driver section, a switch FET section comprising: a drive stage section, a device section, and a current limiting section, wherein the switch FET section electrically couples the bridge driver section to the device section, wherein the fast current clamp is electrically coupled to the device section. By using the drive-bridge configuration, the gate capacitance of the switch FET can be charged and discharged quickly enough to meet the edge rate requirements. The switch FET is driven into and out of saturation such that the current through the device section is either on or off.

16 Claims, 4 Drawing Sheets

Step 401: providing a driver system comprising: a bridge driver section, a switch FET section comprising, a device section comprising at least one light emitting diode (LED), and a current limiting section, wherein the switch FET section electrically couples the bridge driver section to the device section and the current limiting section is electrically coupled to the device section.

Step 403: generating the voltages and signals required drive the switch FET section with the bridge driver section.

Step 405: charging and discharging the switch FET section to power the device section.

Fig. 4

CONSTANT CURRENT HIGH EDGE-RATE DRIVER SYSTEM AND RELATED METHODS

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 111534) is assigned to the United States Government and is available for licensing for commercial purposes. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil.

BACKGROUND OF THE INVENTION

Light emitting diode (LED) arrays can be used to create underwater illumination devices. Because the diodes can be strobed very quickly, they can be used as the transmitting section of an underwater frequency-shift keying (FSK) optical communication system. The problem remains how to switch diodes fast and cleanly enough to support this form of communication. Traditional LED drivers, which provide the diode-voltage independent constant-current source required for driving LED lighting, are not fast enough for the high edge-rate signals required in FSK underwater communications. Similarly, pulse-width modulation (PWM) circuits and class-D amplifiers require high edge-rate signals, particularly for high voltage/power circuits. A driver is needed that can provide flicker frequencies fast enough to support FSK optical communications and other high edge-rate signal applications.

SUMMARY OF THE INVENTION

The present invention relates to a driver system for high edge-rate applications.

According to an illustrative embodiment of the present disclosure, a driver system can include a bridge driver section and a switch FET section electrically coupled to the bridge driver section.

According to a further illustrative embodiment of the present disclosure, a driver system can include a bridge driver section, a switch FET section, a device section, and a current limiting section, wherein the switch FET section electrically couples the bridge driver section to the device section, and wherein the current limiting section is electrically coupled to the device section.

According to a further illustrative embodiment of the present disclosure, a method of optical communication can include providing a driver system, generating the voltages and signals required drive a switch FET section of the driver system with a bridge driver section of the driver system, and charging and discharging the switch FET section to power the device section.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

Throughout the several views, like elements are referenced using like references. The elements in the figures are not drawn to scale and some dimensions are exaggerated for clarity.

The detailed description of the invention particularly refers to the accompanying figures in which:

FIG. 4 shows an exemplary method of optical communication using a driver system.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Figure 1:
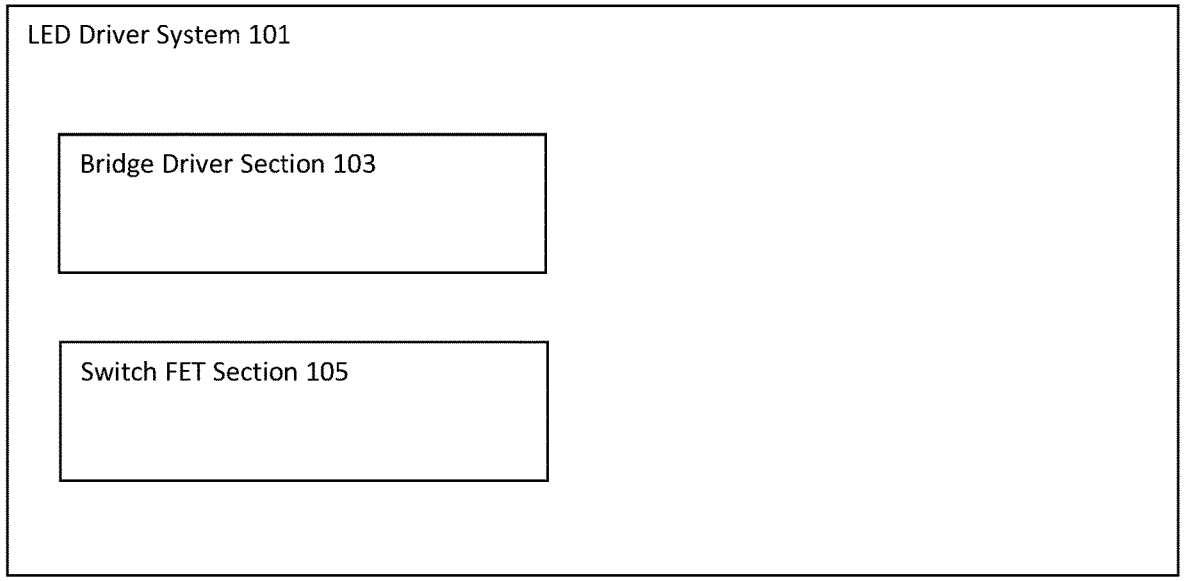
FIG. 1 shows a block diagram of an exemplary driver system.

FIG. 1 shows a block diagram of an exemplary driver system 101. System 101 uses a bridge driver section 103 to generate the voltages and signals required for the system. System 101 uses a switch FET section 105 to control electrically coupled external systems. Switch FET section 105 can be charged and discharged quickly enough to meet the edge rate requirements. This approach allows for an approximate constant-current drive of a device (e.g., LED lighting array, a PWM circuit, class-D amplifiers, etc.) with flicker frequencies fast enough to support operation of the device. It provides for the capability to generate high edge-rate switching drive currents independent of the number of devices powered (e.g., a plurality of diodes in a light string). For diode arrays, because the drive current through the devices is not a function of the forward diode voltage, it holds the effective output constant as the devices heat up.

Figure 2:
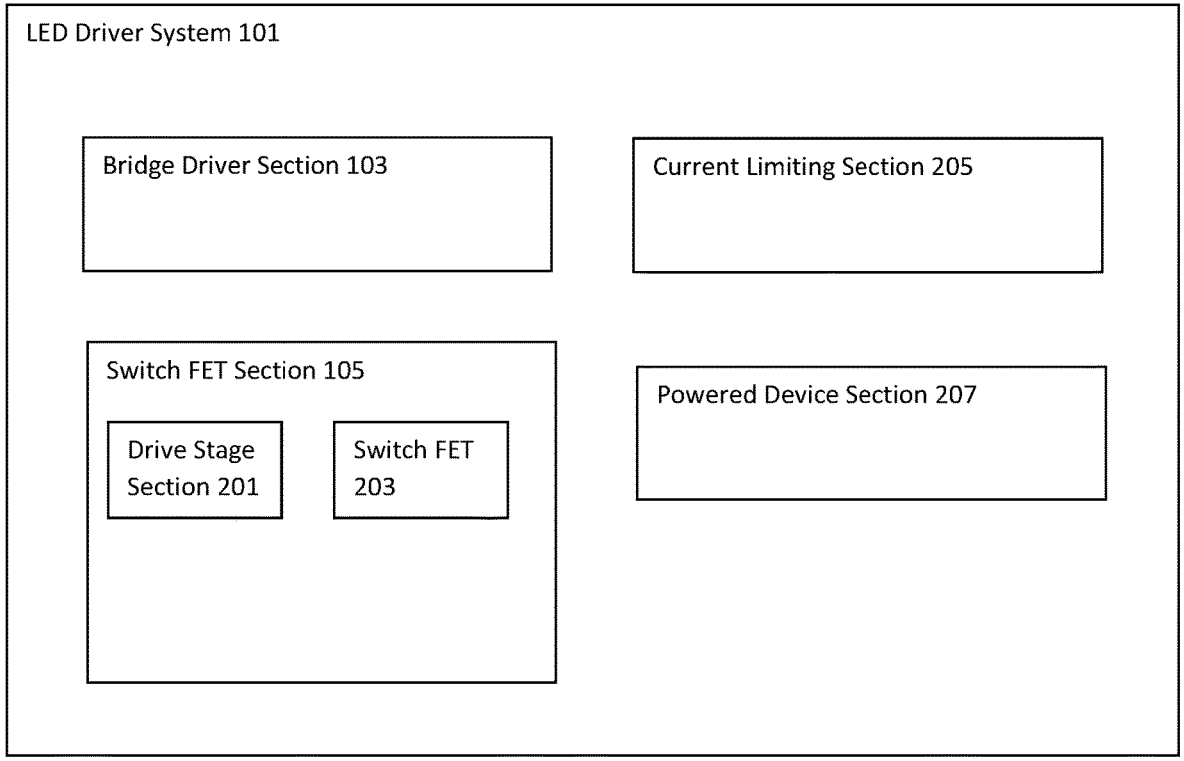
FIG. 2 shows a block diagram of an exemplary driver system with additional components.

FIG. 2 shows a block diagram of an exemplary driver system 101 with additional components. System 101 uses a bridge driver section 103 to generate the voltages and signals required drive a switch FET section 105. The switch FET section 105 can include drive stage section 201 (e.g., n-channel FET transistors) and switch FET 203. System 101 uses the switch FET section 105 to control device section 207. By using the drive-bridge configuration, the gate capacitance of the switch FET section 105 can be charged and discharged quickly enough to meet high edge rate requirements of device section 207. The switch FET 203 within the switch FET section 105 can be driven into and out of saturation such that the current through device section 207 is either on or off. A current limiting section 205 (e.g., a current clamp, a JFET, etc.) can be coupled to switch FET section 105 to keep the apparent integrated optical output of the device section remain constant and be independent of the number of diodes in the array string. The current limiting section 205 is fast enough to limit the current through the device section while preserving the edge rate of the drive signal. In exemplary systems, a current limiting section 205 is not necessary for device sections with inherent impedance that limits the current (e.g., class-D amplifiers). Similarly, diode arrays of sufficiently high power would not need a current limiting section.

Figure 3:
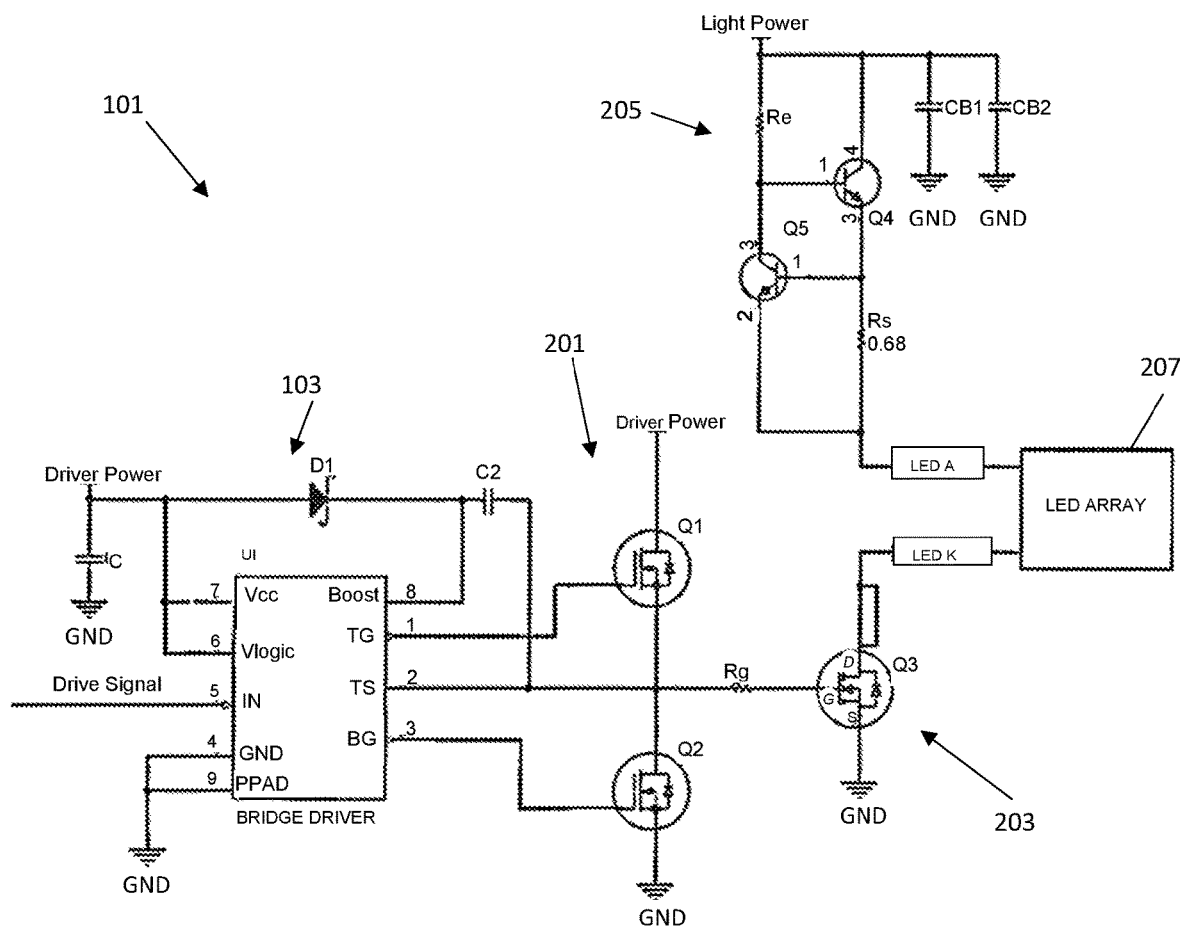
FIG. 3 shows a circuit diagram of an exemplary driver system.

FIG. 3 shows a circuit diagram of an exemplary driver system 101. The circuit includes a bridge driver, a Switch FET, and a fast current-clamp. The bridge driver (e.g., a half-bridge driver) generates the voltages and signals required to drive the two n-channel FET transistors, Q1 and Q2. These bridge transistors are used as a drive stage for the switch FET, Q3. By using the drive-bridge configuration, the gate capacitance of the switch FET can be charged and discharged quickly enough to meet the edge rate requirements. The switch FET is driven into and out of saturation such that the current through the device section 207 is either on or off. Because it is desirable that the apparent integrated optical output of the device section remain constant and be independent of the number of devices in the array string, a fast constant-current clamp including transistors Q4, Q5, Re, and Rs can be included. This subsection clamps the current through the diode array at approximately the the base-emitter voltage of Q5 divided by sense resistor Rs. This clamp is fast enough to limit the current through the devices while preserving the edge rate of the drive signal. By using a clamp instead of a resistor to limit the diode current, the number of devices in the string is independent and provides regulation against power supply variation. In alternative embodiments, a JFET can replace the clamp. In further alternative embodiments, the clamp can be removed entirely.

FIG. 4 shows an exemplary method of optical communication using an exemplary driver system. At step 401: providing a driver system comprising: a bridge driver section, a switch FET section comprising, a device section comprising at least one light emitting diode (LED), and a current limiting section, wherein the switch FET section electrically couples the bridge driver section to the device section and the current limiting section is electrically coupled to the device section. At step 403: generating the voltages and signals required drive the switch FET section with the bridge driver section. At step 405: charging and discharging the switch FET section to power the device section.

Although the invention has been described in detail with reference to certain preferred embodiments, variations and modifications exist within the spirit and scope of the invention as described and defined in the following claims.

The invention claimed is:

1. A driver system comprising:
   a bridge driver section configured to generate voltages and control signals; and
   a switch FET section electrically coupled to the bridge driver section, wherein the switch FET section is configured to be driven into and out of saturation at a rate sufficient to meet high edge-rate requirements to drive a device section.

2. The driver system of claim 1, further comprising:
   a current limiting section configured to limit current through the device section while preserving the edge rate of the drive signal.

3. The driver system of claim 2, wherein the switch FET section comprises a drive stage section and a switch FET.

4. The driver system of claim 3, wherein the drive stage section comprises two n-channel FET transistors.

5. The driver system of claim 3, further comprising a device section electrically coupled to the switch FET section and the current limiting section.

6. The driver system of claim 1, further comprising a device section electrically coupled to the switch FET section.

7. The driver system of claim 6, wherein the device section comprises at least one pulse-width modulation (PWM) circuit.

8. A driver system comprising:
   a bridge driver section;
   a switch FET section comprising a drive stage section and a switch FET configured to be driven into and out of saturation at a rate sufficient to meet high edge-rate requirements;
   a device section; and
   a current limiting section configured to limit current through the device section while preserving the edge rate of the drive signal;
   wherein the switch FET section electrically couples the bridge driver section to the device section;
   wherein the current limiting section is electrically coupled to the device section.

9. The driver system of claim 8, wherein the switch FET section comprises a drive stage section and a switch FET.

10. The driver system of claim 9, wherein the drive stage section comprises first and second n-channel FETs, wherein the bridge driver section comprises a half-bridge driver.

11. The driver system of claim 10, wherein the device section comprises at least one light emitting diode (LED).

12. The driver system of claim 11, wherein the current limiting section comprises a current clamp.

13. The driver system of claim 9, wherein the device section comprises at least one pulse-width modulation (PWM) circuit.

14. A method of optical communication comprising:
   providing a driver system comprising:
      a bridge driver section;
      a switch FET section configured to be driven into and out of saturation at a rate sufficient to meet high edge-rate requirements;
      a device section comprising at least one light emitting diode (LED); and
      a current limiting section configured to limit current through the device section while preserving the edge rate of the drive signal;
      wherein the switch FET section electrically couples the bridge driver section to the device section;
      wherein the current limiting section is electrically coupled to the device section;
   generating the voltages and signals required drive the switch FET section with the bridge driver section; and
   charging and discharging the switch FET section to power the device section.

15. The method of claim 14, the switch FET section comprising:
   a drive stage section comprising first and second n-channel FETs; and
   a switch FET.

16. The method of claim 15, wherein the current limiting section comprises a fast current clamp section comprising first and second clamp transistors and first and second clamp resistors.

* * * * *